US006671032B2

(12) United States Patent
Meschter et al.

(10) Patent No.: US 6,671,032 B2
(45) Date of Patent: Dec. 30, 2003

(54) SIMPLIFIED SELF-DEVELOPING FILM ASSEMBLAGES AND METHODS OF MAKING THE SAME

(75) Inventors: John E. Meschter, Stow, MA (US); Philip R. Norris, No. Reading, MA (US); Harry R. Parsons, Burlington, MA (US); Richard P. Breen, Jr., Foxboro, MA (US)

(73) Assignee: Polaroid Corporation, Waltham, MA (US)

( * ) Notice: Subject to any disclaimer, the term of this patent is extended or adjusted under 35 U.S.C. 154(b) by 12 days.

(21) Appl. No.: 09/900,818

(22) Filed: Jan. 9, 2002

(65) Prior Publication Data

US 2002/0085182 A1 Jul. 4, 2002

Related U.S. Application Data

(60) Provisional application No. 60/216,983, filed on Jul. 7, 2002.

(51) Int. Cl.[7] .......................... G03B 27/32; G03B 27/52

(52) U.S. Cl. .......................................... 355/27; 355/40

(58) Field of Search ............................ 355/27, 40, 75, 355/41; 396/517, 527; 430/207–208, 498

(56) References Cited

U.S. PATENT DOCUMENTS

| | | | | | |
|---|---|---|---|---|---|
| 2,612,450 A | | 9/1952 | Land | 430/207 |
| 2,983,606 A | | 5/1961 | Rogers | 430/240 |
| 3,345,163 A | | 10/1967 | Land, et al. | 430/212 |
| 3,362,819 A | | 1/1968 | Land | 430/213 |
| 3,415,644 A | | 12/1968 | Land | 430/220 |
| 3,473,925 A | | 10/1969 | Milligan et al. | 430/208 |
| 3,594,164 A | | 7/1971 | Rogers | 430/212 |
| 3,594,165 A | | 7/1971 | Rogers | 430/212 |
| 3,636,845 A | * | 1/1972 | Harvey | 95/13 |
| 4,017,879 A | * | 4/1977 | Lermann et al. | 354/304 |
| 4,545,663 A | * | 10/1985 | Douglas | 354/304 |
| 4,560,262 A | * | 12/1985 | Johnson | 354/180 |
| 4,693,963 A | * | 9/1987 | McCole | 430/499 |
| 5,888,693 A | | 3/1999 | Meschter et al. | 430/208 |
| 5,981,137 A | * | 11/1999 | Meschter et al. | 430/208 |
| 6,221,554 B1 | | 4/2001 | Norris et al. | 430/207 |
| 6,291,128 B1 | | 9/2001 | Meschter et al. | 430/208 |

* cited by examiner

*Primary Examiner*—Henry Hung Nguyen

(57) ABSTRACT

A film assemblage of the self-developing type which has a pair of upper and lower carrier sheets in juxtaposed relationship to one another. A pair of openings is provided in each of the carrier sheets. A photosensitive sheet and a positive receiving sheet are joined to outer surfaces of the upper and lower carrier sheets; respectively, so as to cover the respective openings. The pair of upper and lower carrier sheets is fixedly joined together in overlapping relationship, whereby the photosensitive and receiving sheets are in superimposed and spaced apart relationship thereby forming, in combination, an image area of the film.

5 Claims, 3 Drawing Sheets

FIG. 2
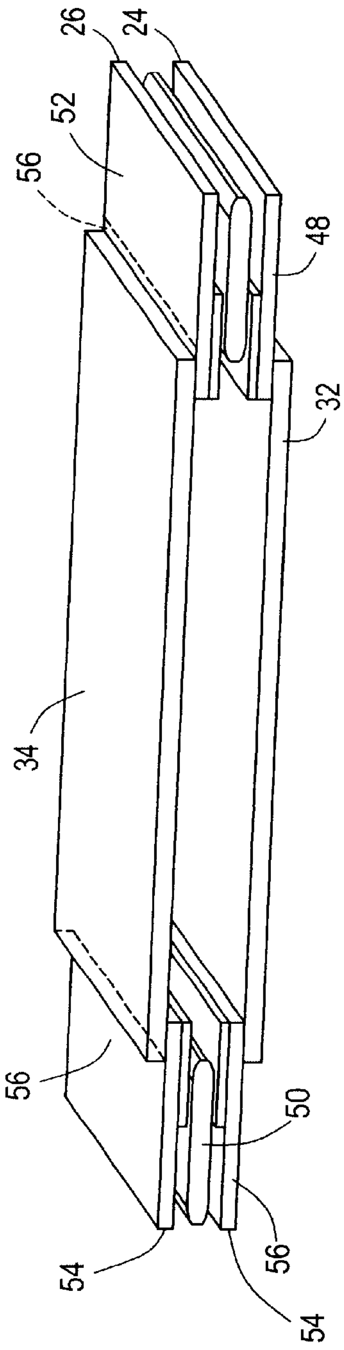
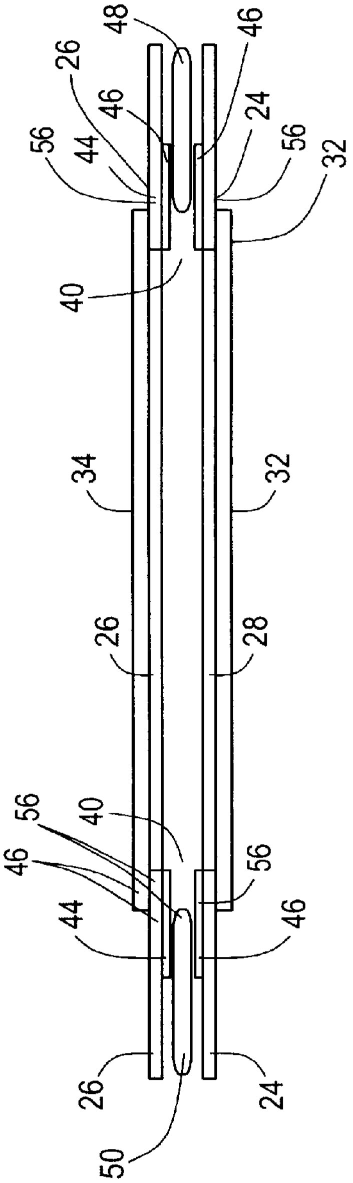
FIG. 3

SIMPLIFIED SELF-DEVELOPING FILM ASSEMBLAGES AND METHODS OF MAKING THE SAME

This application claims priority from and is a conversion of a previously filed and copending U.S. provisional application number 60/216,983 which was filed on Jul. 7, 2000.

BACKGROUND OF THE INVENTION

The present invention relates generally to photographic film assemblages and, more particularly, to simplified self-developing film assemblages and methods of making the same.

With the increasing growth of digital printing on a variety of low-cost media, conventional photographic film assemblages employing relatively more expensive silver halide emulsions face significant competitive challenges. As a consequence, there is an even keener interest to reduce overall film costs. Such interests are even more pronounced in the area of self-developing film assemblages since the latter include a more complex chemistry, and a complicated film construction for capturing and processing images in a self-contained manner. Further, it is desired to allow the user to remove unneeded portions of the latter type of film unit so that only the image bearing portion remains, thereby giving the impression of a conventional 35 mm print or digital print.

Photographic film assemblages of the self-developing type are well-known in the photographic arts and have been described in numerous patents, such as U.S. Pat. Nos.: 2,612,450; 2,983,606; 3,345,163; 3,362,819; 3,415,644; 3,473,925; 3,594,164; 3,594,165; and, 5,888,693 issued to Polaroid Corporation, Cambridge, Mass., USA. In general, these film constructions employ sophisticated packaged constructions comprising several distinct components united in a relatively complex and costly approach in order to achieve a multiplicity of image capturing and processing functions. For instance, the film assemblage allows storing, spreading, collecting, and retaining of the processing fluid that initiates development of latent images. In particular and in terms of the film structure, each film unit generally includes a photosensitive sheet that captures latent images; a positive receiving sheet for producing the developed image; and, a chemical reagent system including the processing fluid. The fluid is stored in a rupturable container or pod for release and distribution between the photosensitive and positive sheets for initiating diffusion transfer, and a trap is used to capture the processed fluid within the confines of the film unit. The film unit functions to safely store the sensitive chemical compositions during handling and processing; insure that such chemicals effect the desired development without degradation; and, prevent leakage and/or contamination of the chemicals.

In addition, each self-developing film of the above type has a different construction in order to work successfully with a particular camera line of the self-developing type. Thus, for example, 600™ film, commercially available from Polaroid, is designed to be optimized with Polaroid's 600™ line of cameras and not other camera lines available from Polaroid. In this regard, for instance, the 600™ film would not operate, as intended, in Spectra™ or Captiva™ cameras, nor would the Captiva™ and Spectra™ films work satisfactorily in the 600™ camera line. It will be appreciated, therefore, that each camera line operates with a different film construction.

Despite the multiplicity of known self-developing film constructions and their commercial success, there is, nevertheless, a continuing desire to simplify them as well as concomitantly reduce material and manufacturing costs, yet retain their high degree of integrity and reliability. Furthermore, there is a desire to arrive at a single unified film architecture that is highly versatile from the standpoint of being capable of being used in a variety of existing and future self-developing camera lines of various film sizes. In addition, there is a desire to be able to remove unneeded film parts, such as pod and trap segments for purposes of presenting the resulting developed image area as a 35 mm style print or as a digital print.

SUMMARY OF THE INVENTION

In this regard, provision is made to provide a film assemblage of the self-developing type comprising a pair of upper and lower carrier sheets in juxtaposed relationship to one another. A pair of openings is provided in each of the carrier sheets. A photosensitive sheet and a positive receiving sheet are joined to outer surfaces of the upper and lower carrier sheets; respectively, so as to cover the respective openings. The pair of upper and lower carrier sheets is fixedly joined together in overlapping relationship, whereby the photosensitive and receiving sheets are in superimposed and spaced apart relationship thereby forming, in combination, an image area of the film. The combined thickness of the carrier sheets, when joined establishes a mechanical gap between the inner surfaces of the superimposed photosensitive and receiving sheets, which gap allows distribution of the processing fluid therebetween. Leading and trailing pairs of flaps are formed from the carrier sheets adjacent corresponding leading and trailing ends of the image area. The leading pair of flaps, when joined together along their marginal edges, form an enclosure for enclosing a rupturable pod of processing fluid. The trailing pair of flaps when joined together along their marginal edges form an enclosure enclosing a fluid collecting trap. Preselected areas that are located intermediate the image area and the pod, and the image area and the trap are treated with a liquidactivated adhesive. The pod when ruptured allows the processing fluid to flow from the pod into and through the gap of the image area to initiate the diffusion transfer process, and from the gap to a passage leading to the fluid trap. Because of the construction, the flow of processing fluid is relatively uninterrupted relative to known self-developing film systems to enhance uniform distribution and substantially minimize formation of image artifacts. The adhesive is activated in response to contact with the processing fluid flowing thereover, thereby effecting a fluid seal between opposing internal surfaces of the carrier sheets when the latter are pressed together as the film is processed such as when passing through the nip of the usual processing rollers used in processing the film.

The foregoing film assemblage is a highly simplified and unified construction that allows the formation of a mechanical gap that controls the flow of processing fluid in an image area with a significantly reduced number of film components. It is an assemblage that establishes areas between the carrier sheets, which areas in one condition allow the flow of processing fluid therethrough and in another condition are able to have zero gap or clearance that allows the formation of simple and reliable seals at both ends of the gapped image area, after the processing fluid activates adhesives in these areas and is subject to pressure from processing rollers. In addition, sealing the zero gap areas allow for easy removal of the pod and trap ends with substantially reduced or eliminated leakage of any processing fluid from not only the gapped image area but from the severed edges of the pod and trap. In addition, a white bordered area or mask can be created around the image area and is internal to the positive sheet by virtue of a white carrier material being provided, thereby eliminating the need for an external masking element.

Among the objects of the present invention are the provisions for: a) an improved film assemblage that is simplified and less costly in construction, yet is reliable in operation; b) an improved film assemblage that is simplified in construction yet is highly versatile in terms of providing a platform for use in a variety of cameras with different sized films; c) a film assemblage that simply and effectively provides desired spacing and functioning, but yet reduces film costs by eliminating several other components such as rails and mask; d) an improved method for reducing significantly the manufacturing steps for fashioning such a film assemblage of the foregoing types; e) an improved film assemblage that allows a user to remove undesired pod and trap segments; f) a film assemblage whose architecture permits the effective sealing of the flow path of a reagent or processing fluid from pod to trap, everywhere except the image areas so that after tearing, severing or otherwise removing the pod and trap segments, the edges of the image area can be sealed against fluid leakage, possible image artifacts can be eliminated; and, the edges of the torn or severed pod and trap are sealed against leakage of processing fluid: and, g) a mask internal to a positive or image receiving sheet can be created by white carrier material being provided.

The above and other objects and further scope of applicability of the present invention will become apparent from reading a detailed description thereof in conjunction with the drawings wherein like reference numerals indicate like structure throughout the several views thereof.

BRIEF DESCRIPTION OF THE DRAWINGS

FIG. 2 is a cross-sectional perspective view of the film assemblage of FIG. 1;

FIG. 3 is a longitudinal cross-sectional elevation view of the assemblage;

DETAILED DESCRIPTION

Figure 1:
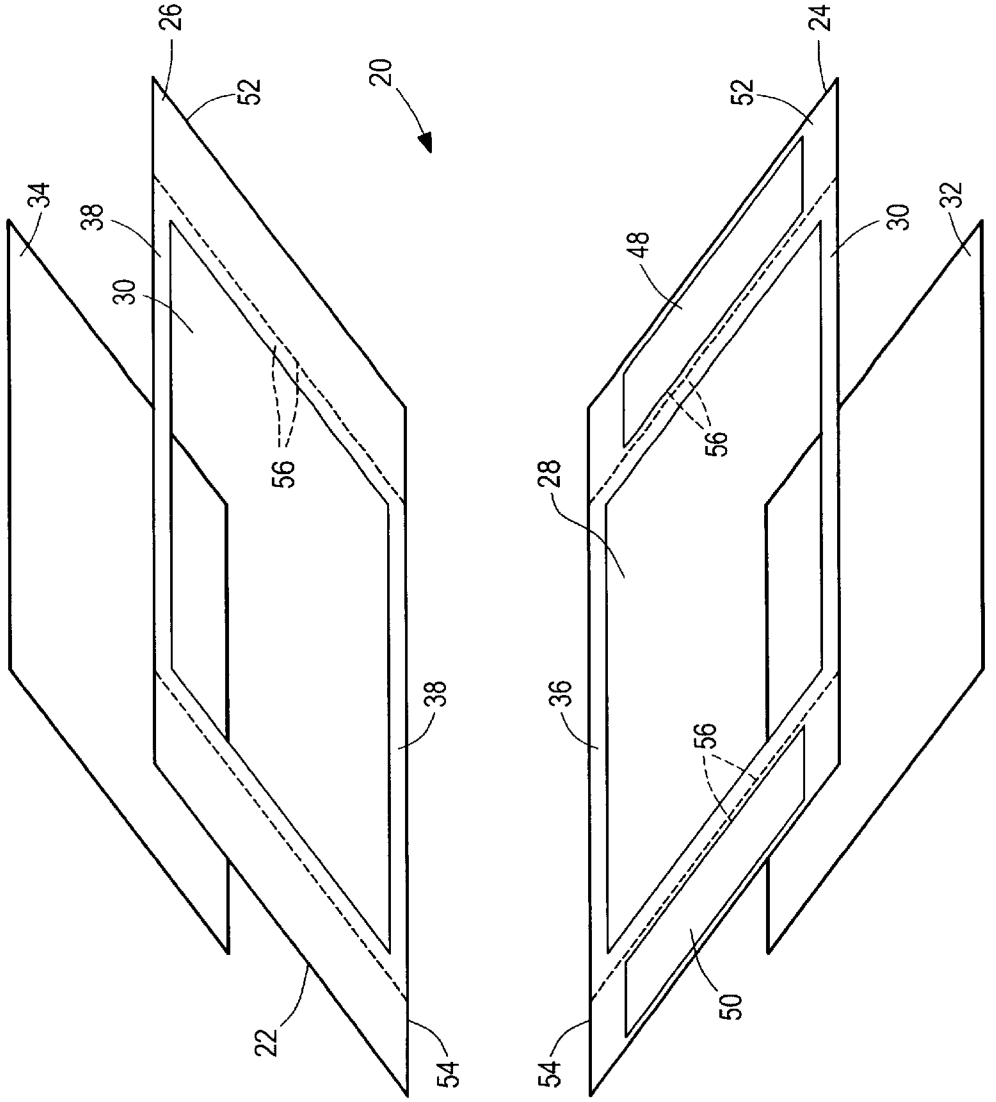
FIG. 1 is an exploded perspective view of a preferred embodiment of a film assemblage of the present invention.

Reference is made to FIGS. 1–6 and 6 for illustrating a preferred embodiment of a self-developing film assemblage 20 made according to the principles of the present invention. While the illustrated film assemblage illustrates only a single film frame or unit 22, it will be appreciated that the film assemblage contemplates a series of interconnected, stacked or internally picked film units. In regard to the latter, the carrier sheets would be extended in length (not shown) and have a plurality of film units (not shown) associated therewith. It will be further understood that each of such units 22 could have a construction similar to that described below, although such need not be the case.

The film assemblage 20 includes a pair of lower and upper overlapping and generally elongated carrier sheets 24 and 26; respectively, having a rectangular configuration and size compatible with self-developing cameras. However, a variety of sheet configurations and sizes are envisioned. The carrier sheets 24 and 26 are made from a relatively inelastic plastic material, such as polyester. While polyester is preferred other plastics having similar flexibility and relatively inelastic properties are contemplated. The carrier sheets 24, 26 should also accept a wide variety of adhesives and/or be capable of heat, pressure, or ultrasonic bonding to each other or other components of the film structure. In addition, other materials besides plastics are contemplated including those known in the photographic arts.

A first rectangular opening 28 is provided in the lower carrier sheet 24. A second rectangular opening 30 is provided in the upper carrier sheet 26. A generally rectangular negative or photosensitive sheet 32 is attached at marginal edges of its perimeter to an outer surface of the lower carrier sheet 24 by means of a suitable adhesive not shown but known in the art, so as to cover the first opening 28. A positive receiving sheet 34 is attached at marginal edges of its perimeter to the outer surface of the upper carrier sheet 26 by means of a suitable adhesive not shown but known in the art, so as to cover the second opening 30. Other ways of securing the photosensitive and positive sheets 32, 34 to cover the openings are contemplated, such as ultrasonic welding.

The upper mating surface 38 and the lower mating surface 36 are shown in FIG. 1. Opposed and mating surfaces 36, 38 of the lower and upper carrier sheets are joined together, in a manner to be described. This is significant because as a result the joined carrier sheets are effective for establishing a predetermined mechanical gap 40 (FIGS. 2 & 3) between the &photosensitive and positive sheets 32, 34. The gap 40 is important for successfully controlling the spreading and distribution of the processing fluid and, hence controls the diffusion transfer process. One significant advantage of the present invention is that it establishes the gap 40 without utilizing rails. Heretofore, rails have been used for setting this gap. Accordingly, the present invention leads to a simplified and less costly construction and one that minimizes the processing steps. Moreover, rails add to manufacturing complexity and costs. Hence, the present invention reduces such costs and complexity. In the context of this embodiment, the gap 40 is established by the combined thickness of each of the carrier sheets 24, 26. Accordingly, it will be noted that the thickness of each of the carrier sheets is selected, so that their combined thickness in juxtaposed relationship is sufficient to provide the desired mechanical gap 40. Therefore, it will be readily appreciated that one carrier sheet can have a thickness different from the other, so long as the combined thickness provides the desired gap. It will be further appreciated, of course, that the gap can have a variety of dimensions, per se, not forming an aspect of the present invention. By eliminating the rails, significant savings are realized in terms of reduced costs of the film, a reduction in the manufacturing costs, as well improved manufacturing throughput. Accordingly, the construction of this embodiment allows the formation of a variety of self-developing films without the need for rails. The carrier sheets 24 and 26 can have a combined thickness in the order of about 4 to 20 mils, although other thickness' are contemplated. In addition, to the above advantages the construction of this embodiment is highly reliable in operation and does not require an external mask.

Formed adjacent the leading and trailing ends of the openings 28, 30 are zones 44, or areas where a liquid activated adhesive, such as an alkali activated adhesive 46, such as Gantrez, will be applied. The adhesive 46 is activated by the processing fluid (not shown) for joining the mutually facing zones 44 when the latter are subject to the compressive forces typically experienced when the film unit is processed by the processing rollers (not shown). Prior to activation of the adhesive 46, the non-adhesively joined zones 44 form passages between the carrier sheets allowing the processing fluid from a ruptured pod 48 to flow into the gap 40 and eventually enter a fluid collecting trap 50. Both the pod 48 and trap 50 have constructions and functions that are well known. Each of the pod and trap is joined to either one of the upper or lower carrier sheets as illustrated between the sheets 24, 26 in areas adjacent the zones 44 prior to the carrier sheets being joined. The carrier sheets 24, 26 define a pair of flaps 52 which are sized and shaped so that when joined they are adapted to form an enclosure for the pod 48. Another pair of flaps 54 is formed by the carrier sheets and is sized and shaped so that when joined they are adapted to form an enclosure for the trap 50 along with a passage for the flow of the processing fluid.

In addition, a white bordered area or mask can be created around the image area and is internal to the positive sheet by virtue of a white carrier material being provided, thereby eliminating the need for an external masking element. In this regard, the white border is comprised of the upper carrier being a white material, preferably polyester.

Figure 4:
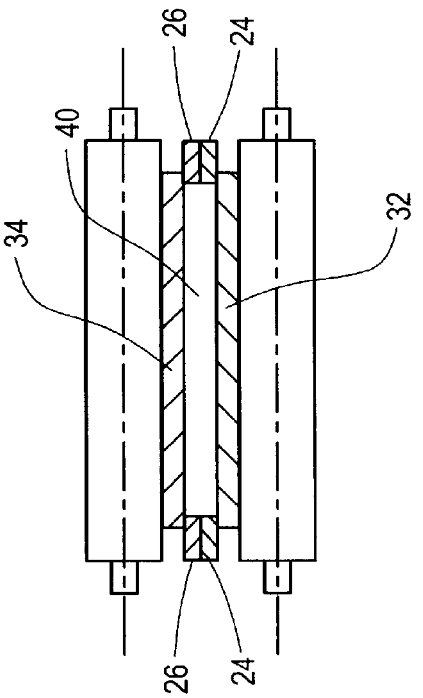
FIG. 4 is a schematic cross-sectional view across the width of the film.

It will be appreciated that the upper and lower carrier sheets are to be joined in a superimposed relationship as illustrated in FIG. 2, whereby the mutually facing surfaces are joined together under the application of heat and pressure and the openings are in registration with each. Consequently, the photosensitive and positive sheets are joined together in superimposed relationship with their inner surfaces having the gap 40 defined by the combined thickness of the carrier sheets. The foregoing construction minimizes interruptions in the flow of processing fluid as compared to other known systems and hence the fluid spreads as well. Moreover, the simplified construction as shown in FIG. 4 at the point of contact with the spread rollers (not shown) makes the processing fluid pathway completely rigid and contained, thereby making the processing fluid flow repeatable and consistent. The foregoing construction is scalable with respect to image size and can thus be used in different sizes and can thus be used in different imaging systems as well as be used to retrofit existing systems.

Figure 6:
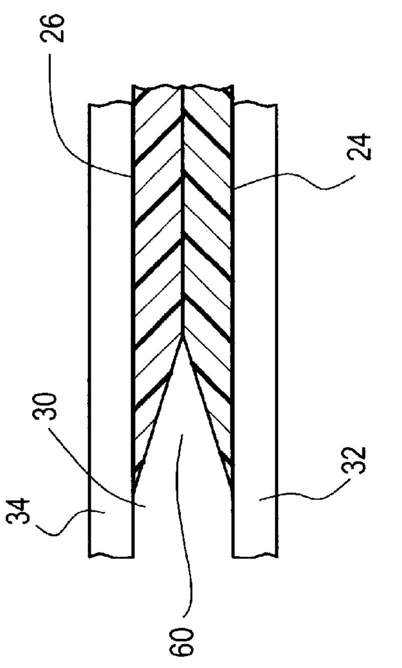

Reference is made to FIG. 6 for illustrating a preferred embodiment. The size of the first opening 28 for the negative is preferably larger than the second opening 30 in the upper carrier sheet 26 for the positive receiving sheet 34. The upper and lower carrier sheets 26, 24 are not joined completely along the mutually facing surfaces. As viewing in cross section of the preferred embodiment, the mutually facing surfaces are joined only a portion of the distance from along their longitudinal edges to the edges of the respective openings. By virtue of the olatter, there is a lateral space 60 adjacent each edge of the first and second openings 28, 30. The lateral space 60 accomodates the lateral edges of the spreading processing fluid and internally mask the edge defects and fringe effects. The different sized openings facilitate the masking effect since the upper carrier sheet extends so as to cover even more edge defects that might occur.

Because of the edge joined upper and lower construction of this film assemblage, all mutually facing areas thereof are joined, prior to processing, but for the gap 40 in the image area, and the spacing between the unadhered zones 44 which form spacings for the passage of the processing fluid to flow from the pod 48 to the image area and from the image area to the trap 50. Once the zero gap areas in the zones 44 have been sealed as explained below, the user can tear or sever portions defining the zero gap without leakage of the processing fluid. For sealing the zones 44, the fluid activated adhesive 46 is activated in response to contact with the processing fluid flowing thereover and pressed together by passage thereof through the spread rollers 100 in order to create sealed zero gap areas. These seals at the end of the image areas and at the severed ends of the pod 48 and trap 50 provide a seal against fluid flow.

Perforations 56 are formed in each pair of the flaps 52, 54 adjacent the sheet sandwich, whereby the perforations will be aligned with each other, when the carrier sheets are joined together. These perforations are formed intermediate the zero gap areas of the zones 44. Although the present embodiments discuss the use of perforations for separating or removing the pod and trap, it will be realized that according to the present invention perforations can be replaced by scored lines. It will be appreciated that a variety of other weakened or frangible connections are possible within the spirit and scope of the invention. When the zones are separated along the perforations and free of the ends of the image area, not only will the free ends of the image area be sealed, but the free ends of the severed pod and trap segments as well.

Another set of weakened areas (not shown) is provided at the leading and trailing ends of each film unit for assisting in singulation of the film units responsive to pulling on the film assemblage from the camera; as is described in commonly-owned U.S. Pat. No. 5,888,693. Accordingly, both pairs of joined pod and trap flaps can be easily removed by tearing along the perforations. This is advantageous since the resulting film unit has a more conventional 35 mm print appearance in that the film portion the user retains is predominantly comprised of the imaged area.

The foregoing film construction is a significant advantage in the art since its formation is both simple and economical given the reduction in the number of components used, and the reduction in the complexity of manufacturing steps. The foregoing construction not only allows formation of zero gap areas between the components that facilitates the sealing and separation or removal of undesired segments including the pod and trap without leakage, but provides for automatic sealing, during passage through the spread rollers, of the ends of the remaining image area together with the opened and removed pod and trap segments. The zero gap areas allow formation of simple and effective seals as opposed to other known approaches that require the utilization of additional and costly components. Because of the alkali based adhesive 46, the ends of the gap 40 are sealed as well by the remaining portions of the zones 44 that are joined to the sheets on one side of the perforation or score lines. This highly effective and simple sealing construction effects the desired and safe removal of the pod 48 and trap 50 and keeps the laminate of sheets, forming the image area, joined together, thereby avoiding the creation of image defects that might be caused by possible delamination of the image area sandwich.

Figure 5:
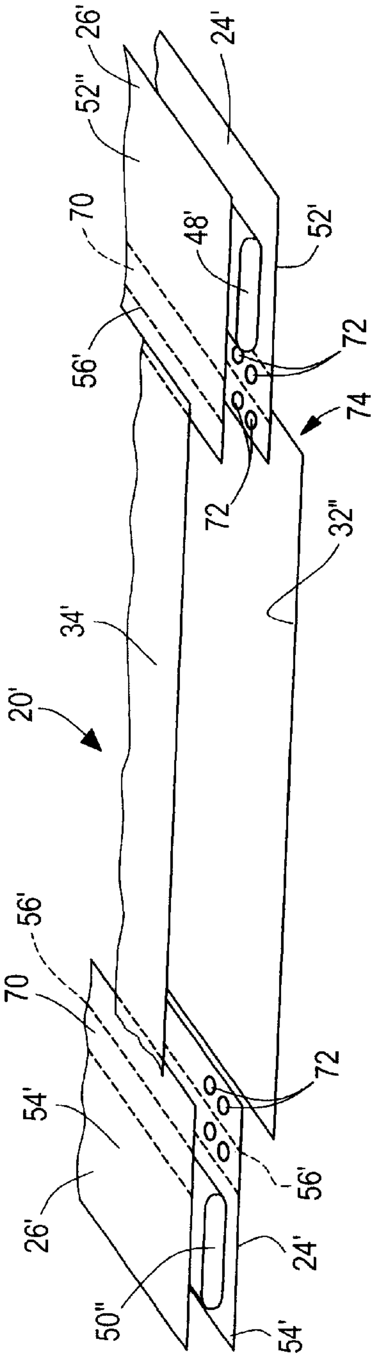
FIG. 5 is a schematic view of another preferred embodiment in an exploded orientation; and, FIG. 6 is schematic and fragmented view of a portion of the film assemblage.

Reference is made to FIG. 5 which illustrates another embodiment. In this regard, instead of a using only a liquid-activated adhesive 46, a dual adhesive arrangement is used. Structure of this embodiment that is similar to the previous will be indicated by the same reference numerals with the addition of a prime marking. In this embodiment, the dual adhesive arrangement includes a first layer 70 of a heat or pressure sensitive type covering portions of the inner surface of the carrier sheets. A plurality of preselected areas 72 (e.g. dots) of the alkali-activated adhesive are added thereto in the zones 44' immediately intermediate the respective pod and trap areas and the sheet sandwich. The areas 72 of liquid-activated adhesives when activated, in response to being exposed to the processing fluid, effect a seal in the zones immediately adjacent the gapped ends of the image area and provide for areas of zero gap on both sides of the perforations. An advantage of a dual adhesive system is that the manufacturing process is less expensive since the entire inner surface of one carrier sheet can be coated, and preselected areas of the alkali-activated adhesive added to the other sheet in the zone 44 area.

Various modifications and adaptations of the present invention will become readily apparent to those of ordinary skill in the art.

What is claimed is:

1. A simplified self-developing film unit comprising:

a positive receiving sheet, a upper carrier sheet, a lower carrier sheet, a negative photosensitive sheet, a processing fluid supply reservoir at a leading end portion of said film unit, a fluid trap at a trailing end portion of said film unit for collecting excess processing fluid traveling from said fluid supply reservoir and through a processing space;

said fluid supply reservoir juxtaposidly disposed between adjacent zones of said upper and lower carrier sheets at said leading end portion of said film unit;

said fluid trap juxtaposidly disposed between adjacent zones of said upper and lower carrier sheets at said trailing end portion of said film unit;

said upper carrier sheet having a bored out inner region defining a second opening and a framelike upper mating surface;

said lower carrier sheet having a bored out inner region defining a first opening and a framelike lower mating surface;

one side of said positive receiving sheet being perimeterly disposed with a perimeter area of a first side of said upper carrier sheet in a fluid-tight manner;

one side of said negative photosensitive sheet being perimeterly disposed with a perimeter area of a first side of said lower carrier sheet in a fluid-tight manner; and a second side of said upper carrier sheet being perimeterly disposed with a perimeter area of a second side of said lower carrier sheet in a fluid-tight manner to define said processing space wherein said processing fluid may travel from said fluid supply reservoir to said fluid trap.

2. The film unit of claim 1 wherein an adhesive is used for said perimeterly disposing of said positive receiving sheet, upper carrier sheet, lower carrier sheet, and negative photosensitive sheet.

3. The film unit of claim 1 wherein an adhesive is used for said juxtaposidly disposing of said fluid supply reservoir between adjacent zones of said upper and lower carrier sheets at said leading end portion of said film unit.

4. The film unit of claim 1 wherein an adhesive is used for said juxtaposidly disposing of said fluid trap between adjacent zones of said upper and lower carrier sheets at said trailing end portion of said film unit.

5. A method of manufacturing a simplified self-developing film unit, said method of manufacturing comprising the steps of:

providing a positive receiving sheet, a upper carrier sheet, a lower carrier sheet, a negative photosensitive sheet, a processing fluid supply reservoir at a leading end portion of said film unit, a fluid trap at a trailing end portion of said film unit for collecting excess processing fluid traveling from said fluid supply reservoir and through a processing space;

providing said fluid supply reservoir juxtaposidly disposed between adjacent zones of said upper and lower carrier sheets at said leading end portion of said film unit;

providing said fluid trap juxtaposidly disposed between adjacent zones of said upper and lower carrier sheets at said trailing end portion of said film unit;

providing said upper carrier sheet having a bored out inner region defining a second opening and a framelike upper mating surface;

providing said lower carrier sheet having a bored out inner region defining a first opening and a framelike lower mating surface;

perimeterly disposing one side of said positive receiving sheet with a perimeter area of a first side of said upper carrier sheet in a fluid-tight manner;

perimeterly disposing one side of said negative photosensitive sheet with a perimeter area of a first side of said lower carrier sheet in a fluid-tight manner; and perimeterly disposing a second side of said upper carrier sheet with a perimeter area of a second side of said lower carrier sheet in a fluid-tight manner to define said processing space wherein said processing fluid may travel from said fluid supply reservoir to said fluid trap.

* * * * *